United States Patent
Moser et al.

(10) Patent No.: US 6,691,888 B2
(45) Date of Patent: Feb. 17, 2004

(54) FUEL TANK

(75) Inventors: Rainer Moser, Idstein (DE); Bing Sun, Bochum (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/990,166

(22) Filed: Nov. 21, 2001

(65) Prior Publication Data

US 2002/0096526 A1 Jul. 25, 2002

(30) Foreign Application Priority Data

Nov. 27, 2000 (DE) ......... 100 58 839

(51) Int. Cl.⁷ ............... B60P 3/22
(52) U.S. Cl. ................. 220/562
(58) Field of Search .......... 220/562, 563, 220/293; 277/651, 652

(56) References Cited

U.S. PATENT DOCUMENTS 4,494,669 A * 1/1985 Villeval .......... 220/203.26
6,435,365 B2 * 8/2002 Pachciarz et al. .... 220/4.14
6,457,726 B1 * 10/2002 Jung ................ 277/611
6,533,288 B1 * 3/2003 Brandner et al. ..... 277/630
2002/0070217 A1 * 6/2002 Sawert et al. ....... 220/254.1

FOREIGN PATENT DOCUMENTS

DE  41 06 864 C1    5/1992  ..... B60K/15/05
DE  198 18 530 A1  11/1998  ..... B65D/43/16
DE  198 46 498 C2  10/2000  ..... B60K/15/05

* cited by examiner

Primary Examiner—Stephen Castellano
(74) Attorney, Agent, or Firm—Richard A. Speer; Mayer, Brown, Rowe & Maw LLP

(57) ABSTRACT

In a fuel tank (1) for a motor vehicle, a cap (4) which closes off an installation opening (3) has a metal insert (11). The metal insert (11) has a pressure-exerting surface (13) which faces toward an edge (9) which laterally delimits the installation opening (3). This construction prevents settling of the material, which in the long term leads to leaks from the fuel tank (1).

2 Claims, 2 Drawing Sheets

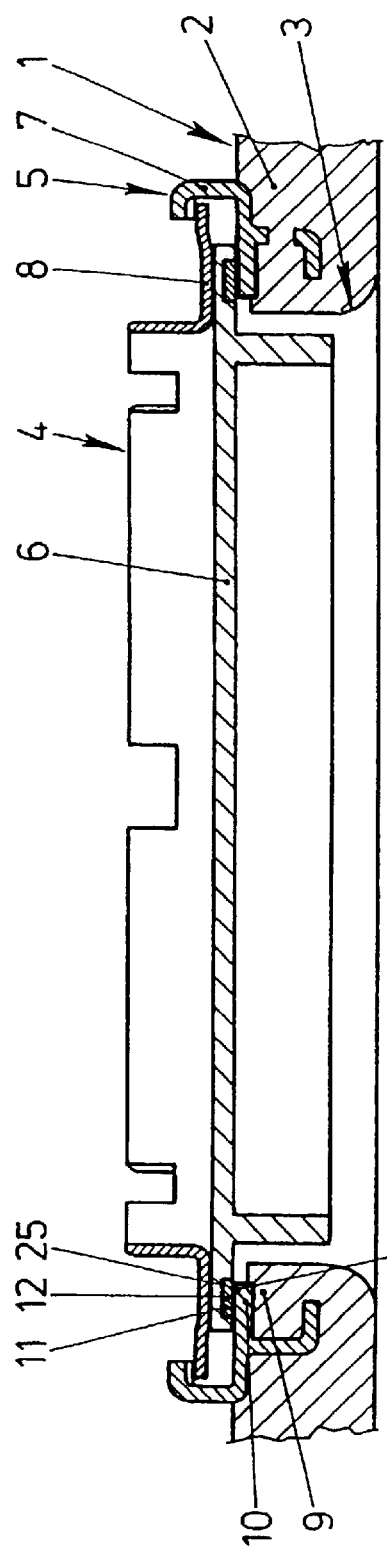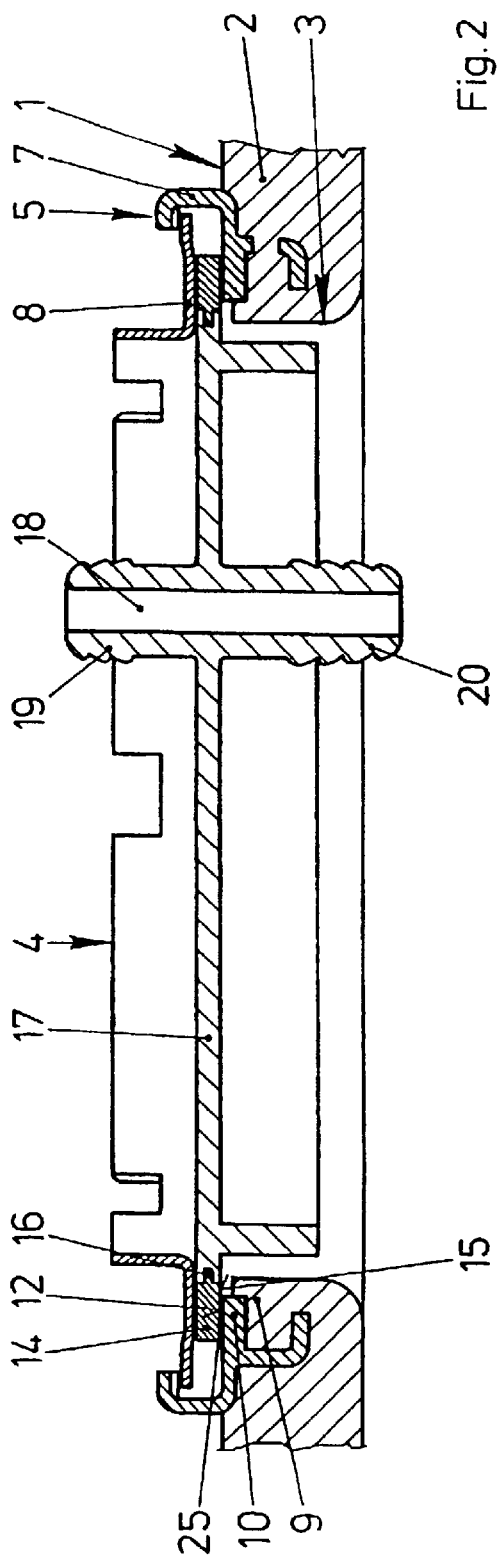

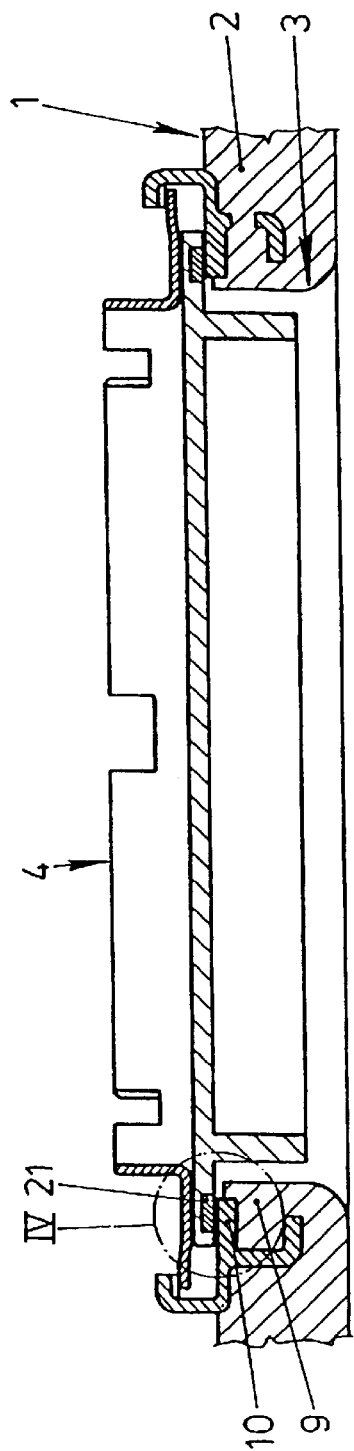
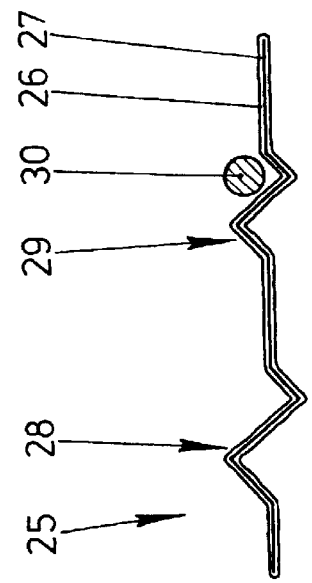
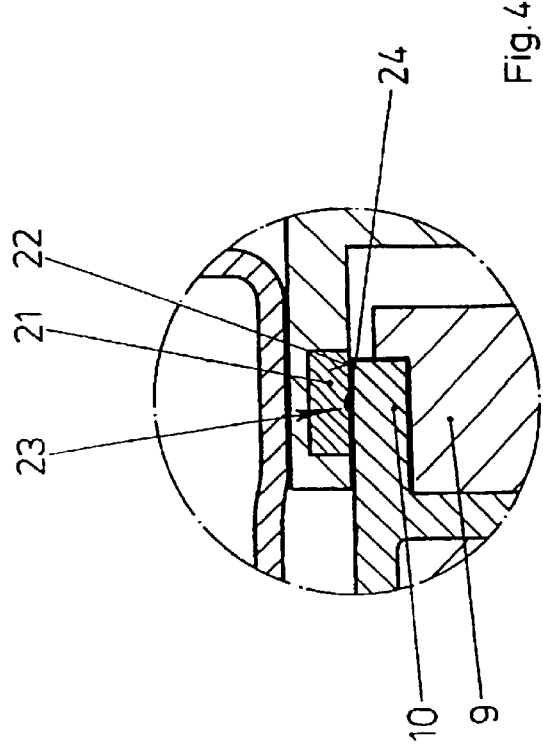

FUEL TANK

BACKGROUND OF THE INVENTION

The invention relates to a fuel tank for a motor vehicle, having an installation opening, having a cap which closes off the installation opening and which is prestressed against the edge of the installation opening, and having a seal which is arranged between the edge of the installation opening and the cap.

A fuel tank of this type is known, for example, from EP 0 838 360 A1. The fuel tank, like the cap, is made from plastic. The cap is prestressed against the edge of the installation opening by means of a bayonet catch. To transmit the prestressing forces from the bayonet catch to the cap, a closure ring is arranged on the side which is remote from the edge of the installation opening. An elastomeric seal is substantially L-shaped in cross section and is clamped between the cap and the installation opening. The cap is sealed in the radial direction by means of sealing lips. In this way, the cap is held reliably against the remaining region of the fuel tank. This makes the cap particularly easy to fit and remove.

Therefore, the seal of the known fuel tank is of a certain thickness. To prevent permeation through the connection, the seal is made from Viton. The drawbacks of this sealing concept are the high costs of the sealing material and the low elasticity at low temperatures. Consequently, in the event of vibrations, temperature changes or pressure changes, the thickness of the seal means that leaks or damage to the seal may occur.

The present invention is based on the problem of refining a fuel tank of the type described in the introduction in such a way that it ensures a permanent seal even in the event of vibrations, fluctuating pressures and temperatures.

BRIEF SUMMARY OF THE INVENTION

According to the invention, this problem is solved by the fact that the edge of the installation opening and that region of the cap which is prestressed against the edge of the installation opening have a pressure-exerting surface of higher strength which faces toward the opposite component, and a thin layer of a sealing material is arranged between the pressure-exerting surfaces.

Arranging the sealing material as a thin layer on the pressure-exerting surface makes it possible to utilize the sealing properties without the drawbacks which arise from a thick layer having an influence on the sealing system. In particular, when the seal is designed in accordance with the invention, the changes in the fuel tank, which are caused by temperature and pressure changes and which led to variable compressive forces in the case of thick layers of sealing material, have no effect on the performance of the seal.

On account of this design, the pressure-exerting surfaces prevent the material of the cap or of the edge of the installation opening from being able to flow and therefore reduce the compressive forces in the long term. Therefore, settling of the fuel tank or of the cap in the region which is to be sealed is kept at a particularly low level. This keeps the escape of fuel vapors from the fuel tank at a particularly low level. The fact that the pressure-exerting surface arranged on the edge of the installation opening is designed with a high strength means that it is now also reliably possible to seal plastic fuel tanks in the region of the installation openings. In the case of fuel tanks made from steel sheet, it is often possible to dispense with the formation of the pressure-exerting surface arranged on the edge of the installation opening. The seal according to the invention is therefore particularly suitable for fuel tanks made from steel sheet.

To produce the high strength of the pressure-exerting surface, the cap could, for example, be made completely out of metal, ceramic or a plastic of similar strength. However, the cap can be produced at particularly low cost if the pressure-exerting surface is arranged on a metal insert.

As in the known fuel tank, the seal could be made completely from an elastomeric material. However, according to another advantageous refinement of the invention, settling of the seal can be kept at a particularly low level if the seal which is arranged between the cap and the edge of the installation opening has a support, preferably a metallic support. In an advantageous configuration, the support is completely covered with the elastomeric sealing material. This allows the elastomeric material to be particularly thin.

According to another advantageous refinement of the invention, the seal has a particularly high stability if the support of the seal has at least one bead. Consequently, the seal produces high prestressing forces against the pressure-exerting surface of the cap or of the edge of the installation opening. This contributes to a further increase in the sealing properties of the fuel tank according to the invention.

According to another advantageous refinement of the invention, a contribution is made to further increasing the prestressing forces of the bead against the opposite pressure-exerting surface if an O-ring is arranged in the bead.

A contribution is made to further increasing the sealing properties of the fuel tank if the pressure-exerting surface has an encircling notch and if the sealing material is arranged in the notch. As a result, either the seal may be formed from the sealing material or the sealing material forms the O-ring which is prestressed into the bead of the seal. Consequently, the dimensions of the sealing material are particularly small, so that it is possible to avoid settling which leads to leaks in the event of fluctuating or low temperatures. This design provides a particularly long-term seal even for fuel tanks made from steel sheet. The types of rubber used in the known fuel tank can be used as sealing material.

The seal according to the invention allows layer thicknesses of the sealing material of from 1 $\mu$m to 2 mm, preferably from 5 $\mu$m to 500 $\mu$m.

The support could, for example, be made from a soft metal which is frequently used for sealing purposes, such as for example copper.

The metal insert for the pressure-exerting surfaces could, for example, also be made from copper. However, according to another advantageous refinement of the invention, the metal insert has a particularly high stability if it is made from steel. Since the high stability of the metal insert keeps the settling of the join between the cap and the remaining region of the fuel tank at a particularly low level, this configuration leads to particularly good sealing properties of the fuel tank according to the invention.

A contribution is made to further increasing the stability of the fuel tank according to the invention in the region of the cap if the metal insert is supported directly on a closure ring or a holding ring of a bayonet catch which prestresses the cap against the edge of the installation opening. This configuration causes the prestressing forces of the cap to be introduced directly into the pressure-exerting surface. The metal insert and the closure ring or the holding ring could, for example, be of integral design.

Instead of using a bayonet catch, the cap can also be secured in other ways, provided that the structure of the seal according to the invention is retained. For example, it is conceivable for the cap to be secured to the fuel tank by means of stud bolts and nuts or by means of a ring which is V-shaped in cross section, the V-shaped ring engaging around the cap and a flange on the fuel tank.

BRIEF DESCRIPTION OF THE DRAWINGS

According to another advantageous refinement of the invention, the number of sealing surfaces is kept particularly low if the metal insert is joined to the respectively adjoining component, which is made from plastic, by a material-to-material bond. This material-to-material bond may be produced, for example, by injection-molding plastic around the metal insert during production of the cap or of the fuel tank.

The invention allows numerous embodiments. Three of these are illustrated in the drawing and are described below in order to further explain the basic principle of the invention. In the drawing:

FIG. 1 shows a sectional illustration through a fuel tank according to the invention in the region of an installation opening, FIG. 2 shows a sectional illustration through a further embodiment of the fuel tank according to the invention in the region of an installation opening, FIG. 2a shows a cross section through a seal from FIGS. 1 and 2, FIG. 3 shows a sectional illustration through a further embodiment of the fuel tank according to the invention in the region of an installation opening, FIG. 4 shows a greatly enlarged illustration of the partial region of the fuel tank which is indicated by IV in FIG. 3.

DETAILED DESCRIPTION OF THE INVENTION

FIG. 1 shows a fuel tank 1 with an installation opening 3 arranged in a wall 2. The installation opening 3 is closed off by a cap 4. For connection purposes, the cap 4 and the wall 2 of the fuel tank 1 have a bayonet catch 5. The fuel tank 1 is made from plastic by injection-molding or blow-molding. In its central region, the cap 4 has a plastic part 6. The cap 4 may, for example, be a closure flange for a fuel feed pump (not illustrated) which is to be used in the fuel tank 1. The cap 4 seals the installation opening 3 after the feed pump has been inserted. The bayonet catch 5 has a holding ring 7 which is secured in the wall 2 of the fuel tank 1 in the region of the installation opening 3. The holding ring 7 interacts with a closure ring 8 which engages behind the cap 4. As a result, the cap 4 is prestressed against an edge 9 of the installation opening 3 by means of an intentional force. The bayonet catch 5 is described in EP 0 838 360 A1, which is hereby incorporated in its entirety.

The cap 4 has an annular metal insert 11. The holding ring 7 has a region 10 which extends in the region of the edge 9 which delimits the installation opening 3. The metal insert 11 is joined to the plastic part 6 of the cap 4 by a material-to-material bond. The regions 10, 11 each have a pressure-exerting surface 12, 13 which faces toward the opposite component. The pressure-exerting surfaces 12, 13 are prestressed against one another in order to seal the installation opening 3. A seal 25 is arranged between the pressure-exerting surfaces. In the case of fuel tanks made from steel sheet, the region 10 can generally be dispensed with, since the required stability of the edge 9 of the installation opening 3 can in this case be produced by suitable shaping.

FIG. 2 shows a further embodiment of the fuel tank 1. This embodiment differs from that shown in FIG. 1 primarily through the fact that a metal insert 14 of the cap 4 is supported directly against the closure ring 8. On the opposite side from the closure ring 8, the metal insert 14 has a pressure-exerting surface 15 which is prestressed toward the pressure-exerting surface 12 of the region 10 of the holding ring 7 on the installation opening 3. As in the embodiment shown in FIG. 1, a seal 25 is arranged between the pressure-exerting surfaces 12, 15. A narrow rim 16 projects radially inward from the metal insert 14 of the cap 4. This rim 16 is joined by a material-to-material bond to a plastic part 17 arranged in the central region of the cap 4. Lines 18 which lead out of the fuel tank 1 are guided through the plastic part 17. For this purpose, the plastic part 17 has a plurality of connection studs 19, 20, of which, to simplify the drawing, only those for a single line 18 are illustrated. Naturally, the metal insert 10 of the edge 9 of the installation opening 3 can be supported against the holding ring 7 in order to further increase the stability.

FIG. 2a shows a sectional illustration of the seal 25 from FIGS. 1 and 2. The seal 25 has a sheet-metal support 27 which is provided with an elastomeric sheath 26. The support 27 has beads 28, 29, by means of which it is prestressed against the pressure-exerting surfaces 12, 13, 15, which are illustrated in FIGS. 1 and 2, of the metal inserts 10, 11, 14. Furthermore, an O-ring 30, which in the assembled state is supported against the pressure-exerting surfaces 12, 13, 15, is arranged adjacent to one of the beads 28, 29.

FIG. 3 shows a further embodiment of the fuel tank 1. FIG. 4 shows a highly enlarged view of that region of the fuel tank 1 from FIG. 3 which is indicated by IV. This embodiment of the fuel tank 1 differs from that shown in FIG. 1 primarily in that a metal insert 21 of the cap 4 has a notch 23 arranged in a pressure-exerting surface 22. In the notch 23 there is a sealing ring 24 which is prestressed against the metal insert 10 of the edge 9 of the installation opening 3. The dimensions of the sealing ring 24 in relation to the pressure-exerting surface 22 of the metal insert 21 are very small, and the sealing ring is made from elastomeric plastic, such as for example NBR, HNBR or FPM. To achieve the small layer thickness of the sealing ring 24, the latter is injection-molded into the notch 23.

What is claimed is:

1. A fuel tank for a motor vehicle comprising:
   (a) a tank body having an installation opening defined by an annular edge which includes a pressure exerting surface;
   (b) a closure cap having a region that extends over the tank body annular edge;
   (c) an annular metal insert providing a pressure exerting surface located in the closure cap region opposite the pressure exerting surface of the tank body annular edge;
   (d) a sealing ring positioned between the pressure exerting surfaces of the tank body and the cap, the sealing ring being constructed of a sheet metal support body encapsulated within an elastomeric sheath, wherein the sheet metal support body has at least one annular bead; and
   (e) an o-ring mounted adjacent the bead.

2. A fuel tank for a motor vehicle comprising:
   (a) a tank body having an installation opening defined by an annular edge which includes a pressure exerting surface;

(b) a closure cap having a region that extends over the tank body annular edge;

(c) an annular metal insert providing a pressure exerting surface located in the closure cap region opposite the pressure exerting surface of the tank body annular edge;

d) a sealing ring positioned between the pressure exerting surfaces of the tank body and the cap, the sealing ring being constructed of a sheet metal support body encapsulated within an elastomeric sheath, wherein the metal insert on the cap is supported directly on a closure ring of a bayonet catch which prestresses the cap against the sealing ring and the tank body edge of the installation opening.

* * * * *